United States Patent [19]
Smith

[11] 3,774,769
[45] Nov. 27, 1973

[54] LIQUID FILTER PRESSURIZED APPARATUS

[75] Inventor: Edward A. Smith, Glenville, Conn.

[73] Assignee: GAF Corporation, New York, N.Y.

[22] Filed: Nov. 22, 1971

[21] Appl. No.: 201,060

[52] U.S. Cl..................... 210/232, 55/373, 55/376, 210/445
[51] Int. Cl............................................. B01d 29/10
[58] Field of Search.................... 210/232, 251, 323, 210/445, 450, 451, 452, 453, 483, 479, DIG. 17; 55/373, 480, 378, 376

[56] References Cited
UNITED STATES PATENTS
2,997,178   8/1961   Lorimer.......................... 210/453 X
2,633,990   4/1953   Simpson et al. .................... 210/282
3,241,679   3/1966   Walter........................... 210/232 X Primary Examiner—Samih N. Zaharna
Assistant Examiner—T. A. Granger
Attorney—Walter C. Kehm et al.

[57] ABSTRACT

An improved pressurized liquid filtering apparatus particularly suitable for relatively small-sized pressure vessels in which a flange member sits in the top portion of the vessel and co-acts with the cover to provide a series of conduits for directing fluid under pressure into and out of the vessel. The flange member includes a number of grooves designed to accept sealing members as well as an internal structural surface for insuring proper alignment of the cover filtering bag and vessel body. An optional restraining means which may be integral or removable from the vessel body enables the invention to operate at pressures above those possible when using the filter bag alone.

3 Claims, 8 Drawing Figures

LIQUID FILTER PRESSURIZED APPARATUS

The present invention relates to an improved pressurized liquid filtering apparatus making use of a filter bag as the operative member for removing contaminants in the fluid flow.

When attempting to utilize filter bag media in relatively small-sized pressurized vessels, a number of serious drawbacks have arisen including: vessel sealing configuration, the relative size between the vessel and the filter media, external plumbing connections, filter media design, overall cost, etc. These factors have tended to promote cartridges and not filter bags for the very problems they create.

By way of background, Applicant has found that up until the present invention, pressure vessels when used in conjunction with filter bags for liquid filtration systems have been fastened in the head portion of such vessel. With such an arrangement, the effective working surfaces are decreased and working pressures are accordingly decreased due to irregularities in the neck area in the filter media and the inability to use a restraining device in conjunction with the filter bag. An alternative approach was suggested in my pending U.S. Pat. application, Ser. No. 38,784, filed May 19, 1970, now U.S. Pat. No. 3,640,392, and entitled, "Pressurized Liquid Filtering Apparatus". According to the disclosure in this application, the pressure vessel cover was arranged to clamp down upon and seal against the opening in the filter bag. Fluid flow into the filter bag was then directed through the cover into the open filter bag mouth and continued to the outlet passage through the body of the vessel itself. This structural configuration has been quite satisfactory for large installations where no special importance is attached to the positioning of the inlet and outlet ports and associated plumbing. Obviously, the same is not true where small vessel size is paramount.

The prior art is replete with examples where compactness and special applications require inlet and outlet ports to be positioned in-line in the head portion of the vessel. However, such pressure vessels have for the most employed filter cartridges and not filter bags.

With some cartridge assemblies, especially when used with small vessels, the head of the vessel is usually permanently fixed in the installation and the body of the vessel is separable by using same to release from the fixed mounted head. This procedure is usually required when the cartridge is spent or the vessel requires cleaning. The advantage of having the inlet and outlet conduits in the head portion of the vessel, allows for simple installation in a straight run of pipeline or the attachment of such vessel to an engine block without external pipelines. It follows that this approach permits the vessel to be used in a multitude of applications where ease of removal is important and costs are to be kept to a minimum because of the absence of external plumbing. In spite of the aforementioned apparent advantages of cartridge vessel assemblies, Applicant has found that the use of such pressure vessels with such filter cartridges have had a number of disadvantages.

By their very nature, cartridges to perform effectively require considerable wall thicknesses per unit volume of filter media being employed.

This requirement must be met in order to provide sufficient structural strength to the cartridges, i.e., withstanding pressure differential across the cartridge.

The life of such filter cartridge assemblies is greatly diminished when compared to comparable filter bags, since the required wall thickness of a cartridge offers greater resistance to fluid flow thus tending to compact the contaminants at a faster rate than filter bags.

The thick wall portions of cartridges tends to fill up with filterable fluids in a manner such that approximately 80 percent of the total cartridge volume can include filterable liquid that is discarded with a spent cartridge.

To provide a cartridge assembly that is capable of operating efficiently in the pressure vessel, it is necessary to spend considerable time in cleaning such vessel with special cleaning solutions.

Filter cartridges are manufactured to produce a structurally semi-rigid member having a dimensional relationship between internal and external diameters as well as overall length that is quite critical. Furthermore, in order to provide for proper sealing, the outlet portion of the cartridge vessel head is provided with a knife-like sharpened end which comes in contact with and bites into one end of the semi-rigid filter cartridge. The body of the pressure vessel has a similar knife edge for biting into and closing off the other end of the cartridge. The elaborate mechanical structure of a pressure vessel for cartridge use also requires a centering device in order to align the cartridge to insure that proper sealing takes place. Because of the fixed distances between the head and body of the knife edge seals in the vessel, the cartridge must be made of a semi-rigid fixed length of material such that proper sealing takes place. In addition to these elaborate features, the cartridge itself must be able to be capped off to prevent bypassing of unfiltered liquid by the lower extremity of the cartridge. This dictates that the body of the pressure vessel has to be filled with contaminants that must be held back by the filter cartridge or else filtration does not take place.

As can be seen from the above, a pressure vessel system employing cartridges as the means for fluid filtration requires adherence to key dimensional relationships, as well as considerable amount of time, material and effort to be employed in order to render such system functional.

It is the main object of the present invention to overcome the deficiencies and shortcomings of the prior art.

Still another object of the present invention is to provide for a highly efficient pressure vessel making use of an associated filter bag member.

Still another object of the present invention is to provide a pressure vessel apparatus making use of inlet and outlet ports integral with the head portion of said pressure vessel.

Still another object of the present invention includes the use of a simple filtration centering device insuring for proper positioning of the filter bag.

The principal features of this invention include:
a vessel having a body portion with a fluid filtering chamber provided therein;
a drainage means at the bottom of said vessel;
cover means adapted to provide closure for said body portion, said cover having a number of integrally formed concentric wall surfaces disposed therein to coact with the top of said vessel and provide means for conducting liquid under pressure to the top of said filtering chamber when the latter is closed;

inlet and outlet means fixedly attached to said cover for directing said fluid under pressure into and out of said vessel;

a filter bag having a ring member disposed about its upper periphery enabling said filter bag to nestle centrally in a filter bag restraining means;

a flange member adapted to fit on the top portion of said vessel to form conduit means for directing fluid into and out of said respective inlet and outlet means;

sealing means disposed on the contact surfaces of said flange member to seal the passages formed between the surfaces of said cover and said flange conduits; and clamping means for manually fastening said cover to said body portion.

Still another important feature of the present invention is directed to:

a body member with drainage means at its lower end;

clamping means affixed to the body of said vessel adapted to positively close a mating cover to said body member; said cover having inlet and outlet guide means and a series of flanged faces on its inner surface;

flange means integrally formed with and extending into said body member adapted to co-act with said flanged faces on the inner surface of said cover;

a series of recesses disposed on said flange means adapted to receive associated sealing members and a ring member having a filter bag depending therefrom; and a series of conduits formed by concentrically-spaced sealing members for the passage of filtered liquid to the downstream of said pressure vessel.

The invention will best be understood by referring to the accompanying drawings in which.

Figure 1:
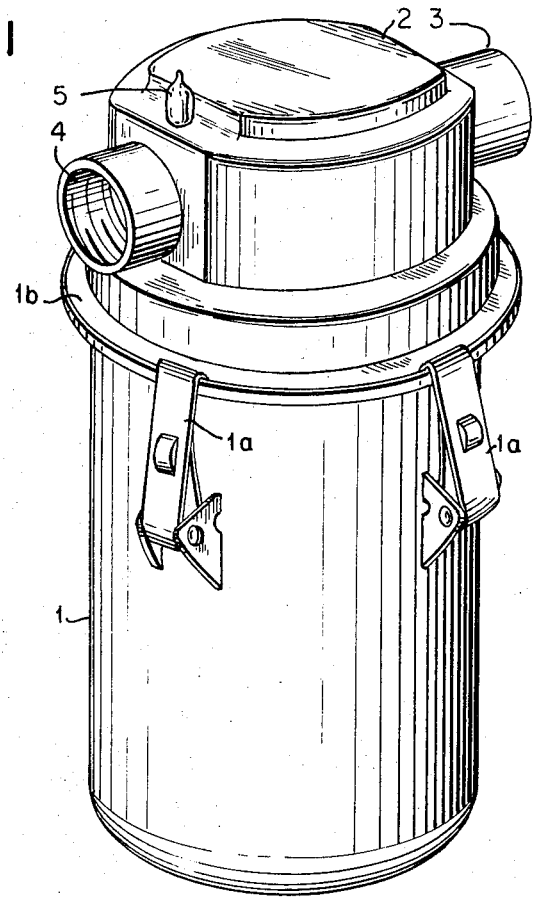
FIG. 1 is a perspective view of a pressure vessel having inlet and outlet portions disposed in the head and is shown with the head member clamped in place.

According to FIG. 1, the pressure vessel is shown in the operating position with the head portion 2 seated on top of the vessel body 1. A series of elongated hook-shaped fasteners 1a are disposed and fixedly attached about the periphery of the vessel body 1. Flange 1b having a turned up lip is designed to mate with fasteners 1a and co-act in a manner to provide positive closure between the vessel body 1 and the head portion 2. The need for precise alignment between the fastener 1a and flange 1b is eliminated, since the lip on flange 1b is engaged at any point about its periphery by fastener 1a. Inlet port 3 and outlet port 4 are disposed in the head portion 2 for effective operation of such pressure vessel. A venting port 5 above outlet portion 4 serves to purge the vessel of trapped fluids and is also used when drainage of the vessel takes place.

Figure 2:
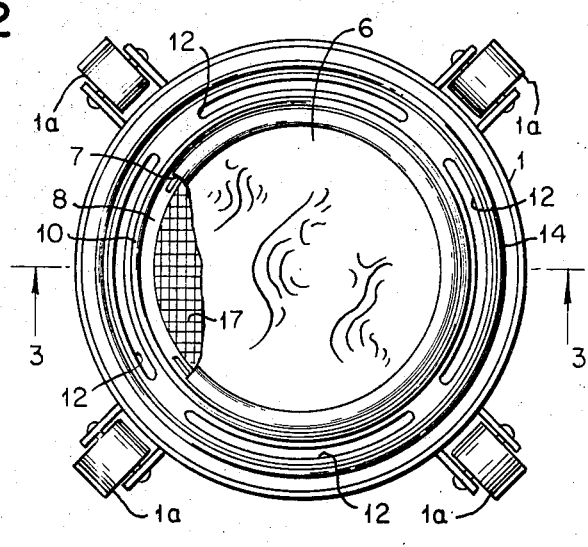
FIG. 2 is a plan view of the vessel mentioned in FIG. 1 with the head member removed.

FIG. 2 shows the proper placement of a filter bag 6 in the body of the vessel 1. The snap ring portion 7 of filter bag 6 is placed in a proper dimensioned groove 8 for support of the mouth of the filter bag 6. The upper portion of the snap ring 7 extends above the groove 8 to accept sealing pressure from a sealing member 9 (see FIG. 3) in the head portion 2 of the vessel.

Figure 3:
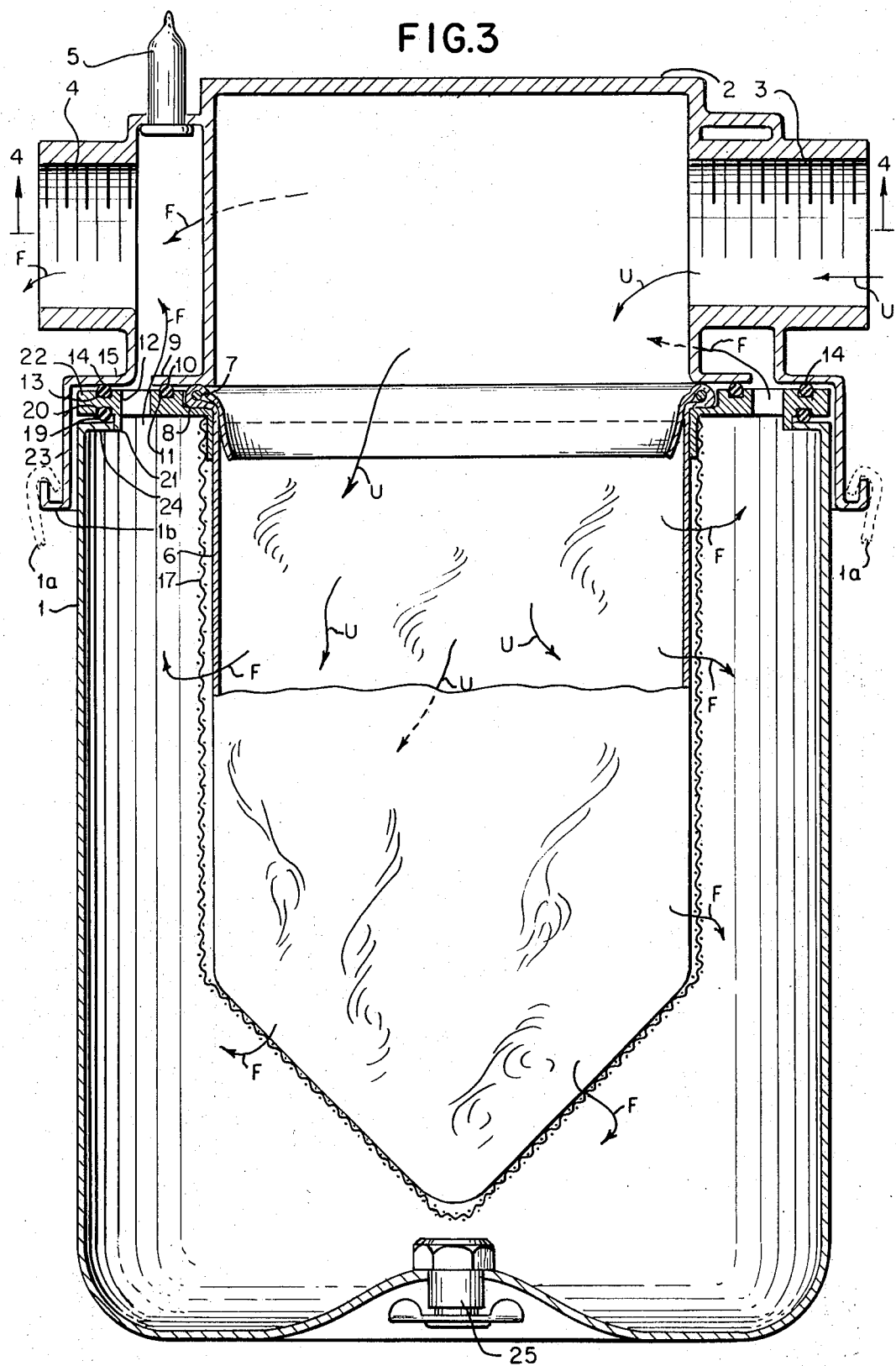
FIG. 3 is a longitudinal sectional view through the line of sight 3,3 of FIG. 2, including the head portion.

This sealing member 9 also applies pressure to an "O" ring or gasket 10 which is disposed directly outboard of the snap ring portion of the filter bag 6 in its own properly dimensioned groove 11 (FIG. 3). Such portion of the sealing arrangement provides for proper sealing of the inlet side 3 to the filter bag 6 enabling only filtered liquid that has passed through the filter bag 6 to travel outward of the bag as shown by arrows F (FIG. 3). Orifices or slots 12 are located in the pressure vessel body 1 directly outboard of the gasketed groove 11. In this manner, the passage of filtered liquid that is outside of the filter bag 6 is able to pass through the body 1 of the pressure vessel and into the head portion 2 for exit. As can be seen from FIG. 3, the orifice section 12 is designed to restrict or control fluid flow or in the alternative to completely un-restrict such fluid flow.

Figure 5A:
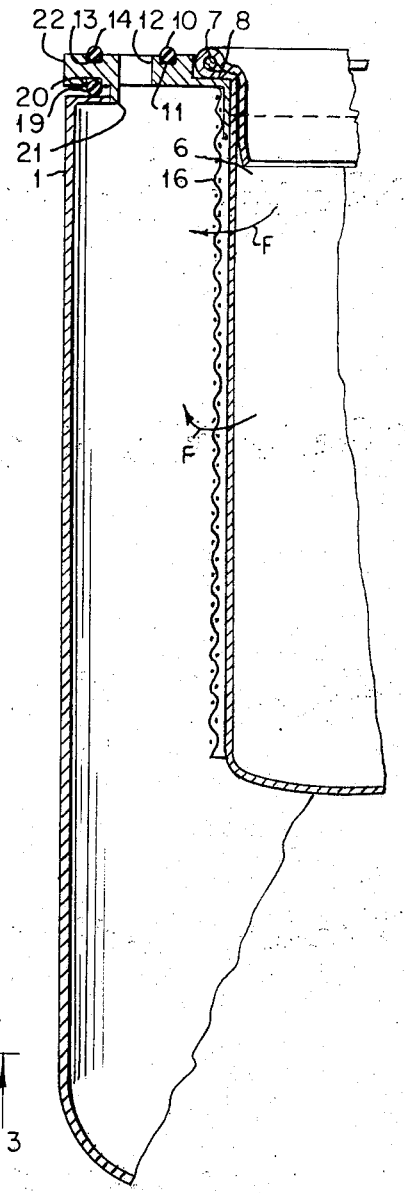
FIG. 5a is a fragmentary view illustrating another embodiment of the present invention in which the bottom section of the screen member is not utilized and the flange member is removable.
Figure 5C:
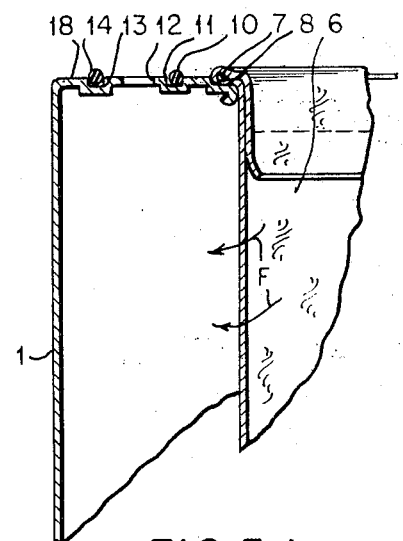
FIG. 5c is yet another embodiment of the present invention in which no screen member is utilized.
Figure 5B:
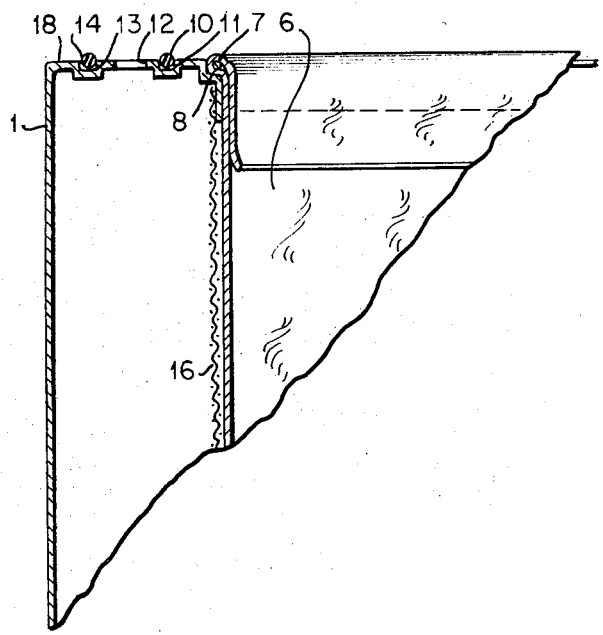
FIG. 5b is a fragmentary view of another embodiment of the present invention in which the screen member is integral with the vessel.
Figure 5D:
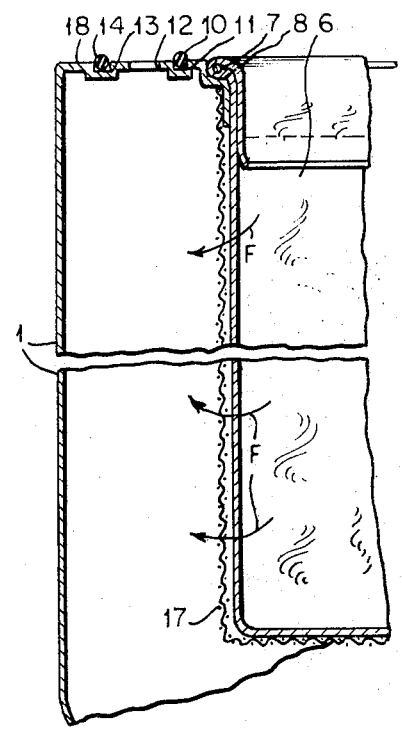
FIG. 5d is a further embodiment of the present invention in which the screen member extends around the entire periphery of the filter bag.

Directly outboard of the orifices 12 of the pressure vessel body 1 there is provided a groove 13 for a second "O" ring or gasket 14 as shown in FIGS. 5b, 5c and 5d. In order to maintain pressure on the downstream side of the vessel and to contain filtered liquid in the outlet portion of the vessel another sealing member 15 (see FIG. 3) is disposed in the head position 2. As described above, seal 10 functions to contain the incoming liquid inboard of the filter bag 6 and to effectively separate both the incoming unfiltered liquid (see arrows U) and the outgoing filtered liquid F.

The preferred embodiment of the present invention as shown in FIG. 3, includes a removable flange member 22 having a porous restraining structure 17 integral therewith and completely surrounding the outer surface of filter bag 6. Such restraining structure enables the vessel to function at pressure levels greater than that possible when using the filter bag in the vessel by itself. The upper limit of workable pressures is determined solely by the strength of the porous restraining structure 17.

In order to insure for adequate sealing between the lower surface of the removable flange 22 and the vessel body 1, an additional "O" ring or gasket 19 is fitted into groove 20. The "O" ring or gasket 19 is positioned directly under "O" ring or gasket 14, though its position can also be either inboard or outboard of "O" ring or gasket 14 on the lower surface of flange 22. The "O" ring or gasket 19 sits on a shoulder 24 disposed on the top rim of the vessel body 1.

Another flange member 21 located on the underside of flange 22 serves to align the restraining structure in the body of the vessel by seating into shoulder 24. To insure for positive alignment between the vessel body and head portions, an extended surface 23 integral with head portion 2 overlaps and is in contact with the periphery of the vessel body 1 (assuming the head portion is fitted to the body). It follows that proper mating of the seals and associated sealing members is assured by the above-mentioned structural configuration. Obviously, other arrangements can perform in an equally satisfactory manner. For example, rings can be placed on the structural member sealing devices and employed to align inboard and outboard of the body or of the head of the vessel.

A drainage valve 25 is located at the lower section of the vessel body 1 and serves as the means for draining fluid from the vessel prior to removal of the body 1 from the head portion 2.

An alternate embodiment of the present invention is shown in FIG. 5c. This structure has particular utility in low-pressure applications, due to the unusually low-strength range of available filter bag materials. The "O" rings or gaskets 14 and 10 in grooves 13 and 11 respectively, are integrally formed in the top portion 26 of the vessel body 1. The orifices 12 as well as the filter bag snap ring 7 seated in groove 8 are likewise disposed in the integrally-formed section of the body 18.

Still another embodiment is shown in FIG. 5b. The structure is similar to that described above except for the use of an integrally-formed porous restraining structure 16. The restraining structure is of a cylindrical shape and is adapted to envelope the side walls of the filter bag 6 only. This configuration lends itself to medium pressure range requirements where the sector forces applied to the un-restrained portion of the filter bag 6 permit failure-free operation at pressure levels greater than without such restraining structure.

FIG. 5d illustrates still another embodiment of the present invention designed to perform at yet higher pressure levels than covered by embodiments shown in FIGS. 5b and 5c. Likewise, the vessel construction is similar to that described above except that the porous restraining structure 17 completely envelopes the filter bag 6 and is integral with the vessel body 1. The range of use of this embodiment is only limited by the strength of the restraining structure 17.

FIG. 5a is identical in construction to FIG. 5b except that restraining flange 26 is removable from the pressure vessel. The operational features of this configuration are identical to those of the structure shown and described for FIG. 3.

Figure 4:
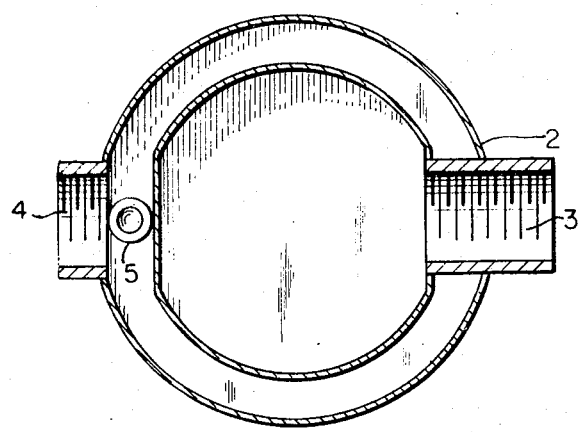
FIG. 4 is a sectional view of the head portion of FIG. 3 taken through the line of sight 4,4.

FIG. 4 illustrates the head portion 2 of the present pressure vessel and includes the inlet and outlet ports 3 and 4, respectively, as well as purging valve 5.

It will be apparent to those skilled in the art from the preceding description, that certain changes may be made in the above apparatus without departing from the scope of the invention. It is intended that the descriptive matter above shall be interpreted as illustrative and in no way limiting, since all equivalents within the scope of the disclosure may be substituted and such substitution is intended.

I claim:
1. An improved pressurized liquid filtering apparatus including:
    a vessel having a body portion with a fluid filtering chamber provided therein;
    a drainage means at the bottom of said vessel;
    cover means adapted to provide closure for said body portion, said cover means having a number of integrally formed concentric wall surfaces disposed therein to co-act with the top of said vessel and provide means for conducting liquid under pressure to the top of said filtering chamber when the latter is closed;
    inlet and outlet means fixedly attached to said cover for directing said fluid under pressure into and out of said vessel;
    a filter bag having a ring member disposed about its upper periphery enabling said filter bag to nestle centrally in a filter bag restraining means open at the bottom and surrounding said filter bag for a substantial portion of its periphery;
    a flange member disposed on the top portion of said vessel to form conduit means for directing fluid into and out of said respective inlet and outlet means and being integrally formed with and extending into said body member for co-acting with the inner surface of said cover;
    sealing means disposed on the contact surfaces of said flange member to seal the passages formed between the surfaces of said cover and said flange conduits; and
    clamping means for manually fastening said cover to said body portion.

2. An improved pressurized liquid filtering apparatus as claimed in claim 1 wherein said filter bag restraining means is adapted to be integrally attached or removed from said body member.

3. An improved pressurized liquid filtering apparatus as claimed in claim 1 wherein said flange member is urged to seat on the top portion of said vessel by means of a structural member having an area concentric therewith and being disposed on the underside of said flange member to form a clearance fit sufficient to properly align said flange member with said vessel body.

* * * * *